(12) United States Patent
Matsuoka

(10) Patent No.: US 11,920,663 B2
(45) Date of Patent: Mar. 5, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Neyagawa (JP)

(*) Notice: Subject to any disclaimer, the term of this patent is extended or adjusted under 35 U.S.C. 154(b) by 0 days.

(21) Appl. No.: 18/325,595

(22) Filed: May 30, 2023

(65) Prior Publication Data

US 2024/0003413 A1 Jan. 4, 2024

(30) Foreign Application Priority Data

Jun. 29, 2022 (JP) .................................. 2022-104513

(51) Int. Cl.
*F16H 41/30* (2006.01)
*F16H 41/04* (2006.01)

(52) U.S. Cl.
CPC ............. *F16H 41/30* (2013.01); *F16H 41/04* (2013.01)

(58) Field of Classification Search
CPC ........... F16H 41/04; F16H 41/30; F16H 45/02
See application file for complete search history.

(56) References Cited

U.S. PATENT DOCUMENTS

| 7,967,561 B2 * | 6/2011 | Samie ..................... F16H 41/30 |
| | | 192/113.21 |
| 2021/0332874 A1* | 10/2021 | Matsuoka ............... F16H 45/02 |

FOREIGN PATENT DOCUMENTS

JP 11182649 A * 7/1999
JP 2021188732 A 12/2021

* cited by examiner

*Primary Examiner* — Abiy Teka
(74) *Attorney, Agent, or Firm* — United IP Counselors, LLC

(57) ABSTRACT

A drive unit includes a prime mover, a torque converter, and a torque converter casing. The torque converter is configured to amplify a torque generated by the prime mover. The torque converter is disposed to be rotatable. The torque converter casing is disposed to be non-rotatable. The torque converter casing accommodates the torque converter. The torque converter casing includes a first air intake port and a first air discharge port. The first air intake port is configured to draw air into the torque converter casing therethrough. The first air discharge port is configured to discharge the air inside the torque converter casing therethrough. The drive unit allows the torque converter to be cooled.

10 Claims, 3 Drawing Sheets

DRIVE UNIT

CROSS-REFERENCE TO RELATED APPLICATIONS

This application claims priority to, and the benefit of, Japan Patent Application No. 2022-104513, filed Jun. 29, 2022. The contents of that application are incorporated by reference herein in their entirety.

TECHNICAL FIELD

The present invention relates to a drive unit.

BACKGROUND ART

There has been proposed a type of drive unit including a torque converter in order to amplify a torque of a prime mover such as an electric motor or an engine (see Japan Laid-open Patent Application Publication No. 2021-188732). The torque converter includes an impeller, a turbine, and a stator. Hydraulic oil is filled between the impeller and the turbine; then, the torque is transmitted from the impeller to the turbine through the hydraulic oil.

Heat is generated in the torque converter when the impeller and the turbine are rotated at different speeds or when a lock-up clutch becomes a slip state. In view of the above, it is an object of the present invention to provide a drive unit in which a torque converter can be cooled.

BRIEF SUMMARY

A drive unit according to a first aspect includes a prime mover, a torque converter, and a torque converter casing. The torque converter is configured to amplify a torque generated by the prime mover. The torque converter is disposed to be rotatable. The torque converter casing is disposed to be non-rotatable. The torque converter casing accommodates the torque converter. The torque converter casing includes a first air intake port and a first air discharge port. The first air intake port is configured to draw air into the torque converter casing therethrough. The first air discharge port is configured to discharge the air inside the torque converter casing therethrough.

As described above, the torque converter casing includes the first air intake port and the first air discharge port; hence, the fresh air is supplied into the torque converter casing. Heat exchange is made between the air inside the torque converter casing and the torque converter, whereby the torque converter casing can be cooled. It should be noted that the air, discharged through the first air discharge port, is supplied to a battery, the interior of a vehicle cab, or so forth, whereby heat generated in the torque converter can be effectively utilized.

A drive unit according to a second aspect relates to the drive unit according to the first aspect and is configured as follows. The first air discharge port is disposed above the first air intake port. According to this configuration, the air inside the torque converter casing can be effectively discharged.

A drive unit according to a third aspect relates to the drive unit according to the first or second aspect and is configured as follows. The first air discharge port is disposed radially outside the first air intake port. According to this configuration, a stream of air can be effectively produced from the first air intake port to the first air discharge port.

A drive unit according to a fourth aspect relates to the drive unit according to any of the first to third aspects and is configured as follows. The prime mover is an electric motor.

A drive unit according to a fifth aspect relates to the drive unit according to the fourth aspect and is configured as follows. The electric motor includes a rotor, a motor stator, and a motor casing. The rotor is disposed to be rotatable. The motor stator is disposed radially away from the rotor at an interval. The motor casing accommodates the rotor and the motor stator. The motor casing includes a second air intake port and a second air discharge port. The second air intake port is configured to draw the air into the motor casing therethrough. The second air discharge port is configured to discharge the air inside the motor casing therethrough.

A drive unit according to a sixth aspect relates to the drive unit according to the fifth aspect and is configured as follows. The second air intake port is disposed axially away from the second air discharge port at an interval. The rotor and the motor stator are disposed axially between the second air intake port and the second air discharge port. According to this configuration, a stream of air can be produced to flow between the rotor and the motor stator.

A drive unit according to a seventh aspect relates to the drive unit according to any of the first to sixth aspects and further includes an air discharge channel extending from the first air discharge port to an object to be heated.

A drive unit according to an eighth aspect relates to the drive unit according to the seventh aspect and further includes a circulation channel. The circulation channel is configured to return the air to the first air intake port after the air is transferred to the object to be heated.

A drive unit according to a ninth aspect relates to the drive unit according to any of the first to eighth aspects and further includes a blower. The blower is configured to supply the air into the torque converter casing through the first air intake port.

Overall, according to embodiments of the present invention, the torque converter can be cooled.

DETAILED DESCRIPTION

Figure 1:
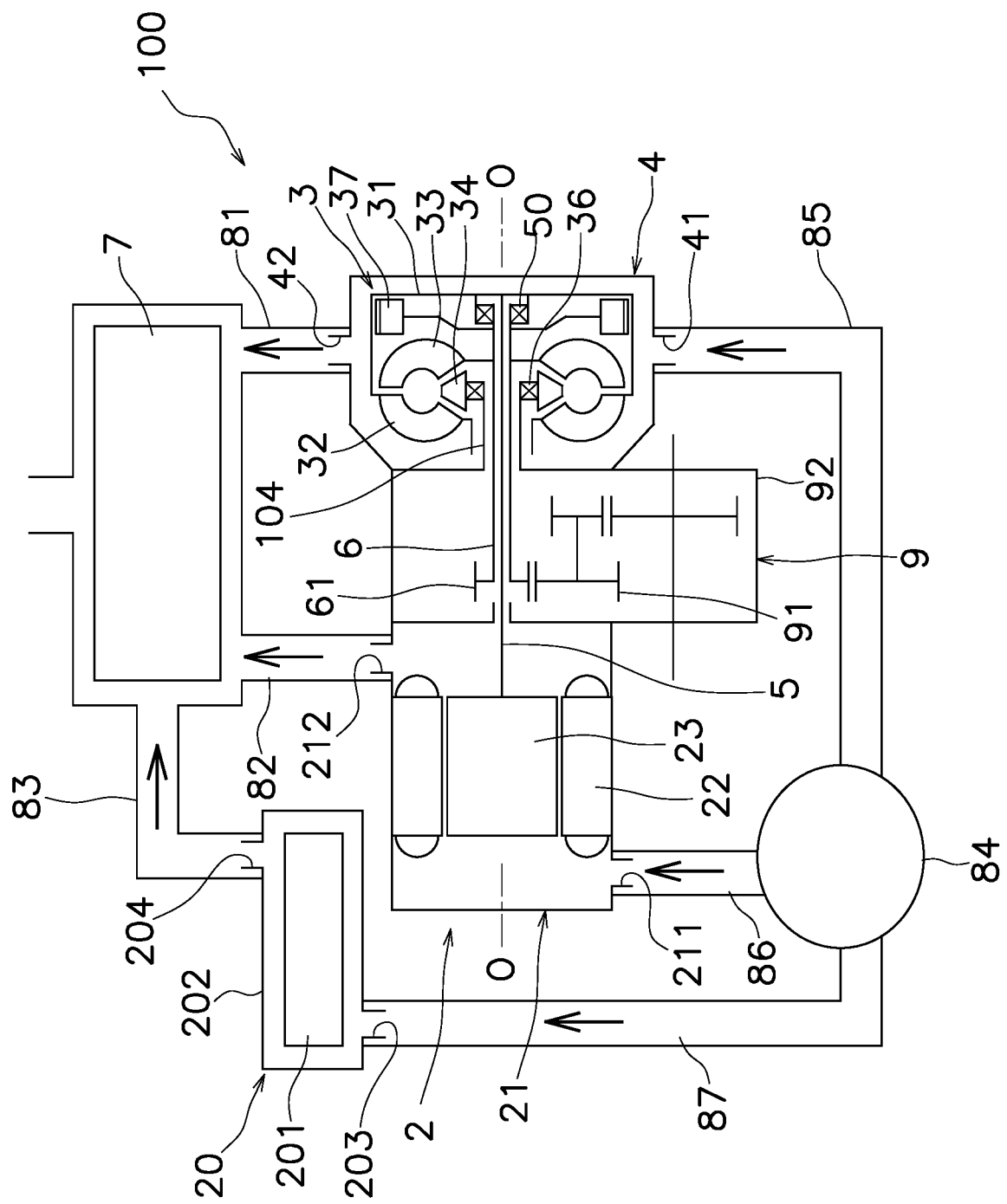
FIG. 1 is a schematic diagram of a drive unit.

An embodiment of a drive unit will be hereinafter explained with reference to a drawing. FIG. 1 is a schematic diagram of the drive unit according to the present embodiment. It should be noted that in the following explanation, the term "axial direction" refers to an extending direction of a rotational axis O of a prime mover or a torque converter 3. On the other hand, the term "circumferential direction" refers to a circumferential direction of an imaginary circle about the rotational axis O, whereas the term "radial direction" refers to a radial direction of the imaginary circle about the rotational axis O. Moreover, the term "forward rotation" refers to rotation in forward movement of a vehicle, whereas the term "reverse rotation" refers to rotation in rearward movement of the vehicle.

[Drive Unit 100]

As shown in FIG. 1, a drive unit 100 includes an electric motor 2 (exemplary prime mover), the torque converter 3, a torque converter casing 4, a first drive shaft 5, a second drive shaft 6, an inverter 20, a battery 7, a first air discharge channel 81 (exemplary air discharge channel), a second air discharge channel 82, a third air discharge channel 83, and a reducer 9. The drive unit 100 is installed in, for instance, an electric car. The drive unit 100 is configured to drive one or more drive wheels (not shown in the drawing). It should be noted that in the present embodiment, the battery 7 is an object to be heated.

<Electric Motor 2>

The electric motor 2 includes a motor casing 21, a motor stator 22, and a rotor 23. In the present embodiment, the electric motor 2 is of a so-called inner rotor type. The motor casing 21 is non-rotatable, while being fixed to a vehicle body frame or so forth. The motor stator 22 and the rotor 23 are accommodated inside the motor casing 21.

The motor stator 22 is fixed to the inner peripheral surface of the motor casing 21. The motor stator 22 is non-rotatable. The rotor 23 is rotated about the rotational axis O. The rotor 23 is disposed radially inside the motor stator 22. The motor stator 22 is disposed radially away from the rotor 23 at an interval.

The motor casing 21 includes a second air intake port 211 and a second air discharge port 212. Each of the second air intake port 211 and the second air discharge port 212 is composed of at least one through hole that penetrates the motor casing 21 so as to make the inside and the outside of the motor casing 21 communicate therethrough with each other.

The second air intake port 211 is configured to draw the air into the motor casing 21 therethrough. The fresh air is supplied into the motor casing 21 through the second air intake port 211.

The second air discharge port 212 is configured to discharge the air inside the motor casing 21 to the outside of the motor casing 21 therethrough. The air inside the motor casing 21 is discharged to the outside of the motor casing 21 through the second air discharge port 212.

The second air intake port 211 is disposed away from the second air discharge port 212 at an interval in an axial direction. The motor stator 22 and the rotor 23 are disposed between the second air intake port 211 and the second air discharge port 212 in the axial direction. Because of this, the air, drawn into the motor casing 21 through the second air intake port 211, passes through the gap between the motor stator 22 and the rotor 23 and then flows to the second air discharge port 212. It should be noted that the term "axial direction" herein refers to an extending direction of the rotational axis of the electric motor 2.

The second air discharge port 212 is disposed above the second air intake port 211. The second air discharge port 212 is opened upward. The second air intake port 211 is opened downward.

<Inverter 20>

The inverter 20 is configured to control the rotational speed of the electric motor 2. The inverter 20 includes an inverter body 201 and an inverter casing 202. The inverter body 201 is composed of a printed circuit board, one or more conductive elements, and so forth.

The inverter casing 202 is configured to accommodate the inverter body 201. The inverter casing 202 includes a third air intake port 203 and a third air discharge port 204. Each of the third air intake port 203 and the third air discharge port 204 is composed of at least one through hole that penetrates the inverter casing 202 so as to make the inside and the outside of the inverter casing 202 communicate therethrough with each other.

The third air intake port 203 is configured to draw the air into the inverter casing 202 therethrough. The fresh air is supplied into the inverter casing 202 through the third air intake port 203.

The third air discharge port 204 is configured to discharge the pair inside the inverter casing 202 to the outside of the inverter casing 202. The air inside the inverter casing 202 is discharged to the outside of the inverter casing 202 through the third air discharge port 204.

<Torque Converter 3>

The torque converter 3 is disposed away from the electric motor 2 at an interval in the axial direction. The reducer 9 is disposed between the torque converter 3 and the electric motor 2. The electric motor 2, the reducer 9, and the torque converter 3 are aligned in this order in the axial direction.

The torque converter 3 is disposed to be rotatable. The rotational axis O of the torque converter 3 is substantially matched with that of the electric motor 2. The torque converter 3 is a device to which a torque, outputted from the electric motor 2, is transmitted. The torque converter 3 is configured to amplify the torque outputted from the electric motor 2.

The torque converter 3 further includes a cover 31, an impeller 32, a turbine 33, a stator 34, a first one-way clutch 36, and a centrifugal clutch 37 (exemplary lock-up clutch). In the present embodiment, the outer shell of the torque converter 3 is composed of the cover 31 and the impeller 32.

The torque converter 3 is configured such that the impeller 32 is disposed on the electric motor 2 side (the left side in FIG. 1), whereas the cover 31 is disposed on the opposite side of the electric motor 2 (the right side in FIG. 1). The torque converter 3 is accommodated inside the torque converter casing 4. Hydraulic fluid is supplied into the torque converter 3. The hydraulic fluid is, for instance, hydraulic oil. It should be noted that the space inside the torque converter 3 and that inside the torque converter casing 4 are partitioned off while being airtightly sealed therebetween. Because of this, the hydraulic fluid inside the torque converter 3 does not leak out into the torque converter casing 4.

The cover 31 is a component to which the torque, transmitted from the electric motor 2, is inputted. The cover 31 is rotated by the torque transmitted thereto from the electric motor 2. The cover 31 is fixed to the first drive shaft 5. For example, the cover 31 includes a spline hole to which the first drive shaft 5 is spline-coupled. Because of this, the cover 31 is unitarily rotated with the first drive shaft 5. The cover 31 is disposed to cover the turbine 33.

The impeller 32 is unitarily rotated with the cover 31. The impeller 32 is a component to which the torque, transmitted from the electric motor 2, is inputted through the cover 31. The impeller 32 is fixed to the cover 31. The impeller 32 is rotatably supported by a stationary shaft 104 through a bearing member (not shown in the drawing). It should be noted that the stationary shaft 104 has a cylindrical shape. The impeller 32 and the stationary shaft 104 are airtightly sealed therebetween. The second drive shaft 6 extends through the interior of the stationary shaft 104 in the axial direction. The stationary shaft 104 extends from, for instance, a reducer casing 92 or the torque converter casing 4 and is non-rotatable.

The turbine 33 is disposed in opposition to the impeller 32. When described in detail, the turbine 33 is opposed to the impeller 32 in the axial direction. The turbine 33 is a component to which the torque is transmitted from the impeller 32 through the hydraulic fluid.

The second drive shaft 6 is attached to the turbine 33. When described in detail, the second drive shaft 6 is spline-coupled to the turbine 33. The turbine 33 is unitarily rotated with the second drive shaft 6.

The stator 34 is configured to regulate the flow of the hydraulic fluid returning from the turbine 33 to the impeller 32. The stator 34 is rotatable about the rotational axis O. For example, the stator 34 is supported by the stationary shaft 104 through the first one-way clutch 36. The stator 34 is disposed between the impeller 32 and the turbine 33 in the axial direction.

The first one-way clutch 36 is disposed between the stationary shaft 104 and the stator 34. The first one-way clutch 36 is configured to make the stator 34 rotatable in the forward rotational direction. By contrast, the first one-way clutch 36 makes the stator 34 non-rotatable in the reverse rotational direction. The torque is transmitted from the impeller 32 to the turbine 33, while being amplified by the stator 34.

The centrifugal clutch 37 is attached to either the turbine 33 or the second drive shaft 6. The centrifugal clutch 37 is unitarily rotated with the turbine 33. The centrifugal clutch 37 is configured to couple the cover 31 and the turbine 33 to each other by a centrifugal force generated in rotation of the turbine 33. When described in detail, the centrifugal clutch 37 is configured to transmit the torque from the cover 31 to the turbine 33 when the rotational speed of the turbine 33 becomes greater than or equal to a predetermined value.

<Reducer 9>

The reducer 9 is disposed between the electric motor 2 and the torque converter 3 in the axial direction. The reducer 9 transmits the torque, transmitted thereto from the torque converter 3, to a drive wheel side. When described in detail, the reducer 9 amplifies the torque transmitted thereto from the torque converter 3 and transmits the amplified torque to the drive wheel side. It should be noted that the reducer 9 includes a plurality of gears 91. The reducer 9 is accommodated inside the reducer casing 92. It should be noted that one of the plural gears 91 is meshed with a gear 61 fixed to the second drive shaft 6.

<First Drive Shaft 5>

The first drive shaft 5 extends from the electric motor 2 in the axial direction. When described in detail, the first drive shaft 5 extends from the rotor 23 of the electric motor 2. It should be noted that when the electric motor 2 includes an output shaft, the first drive shaft 5 is attached to the output shaft of the electric motor 2. The rotational axis of the first drive shaft 5 is substantially matched with that of the electric motor 2 and that of the torque converter 3.

The first drive shaft 5 transmits the torque between the electric motor 2 and the torque converter 3. When described in detail, the first drive shaft 5 transmits the torque, inputted thereto from the electric motor 2, to the torque converter 3. The first drive shaft 5 is connected to the impeller 32 of the torque converter 3. When described in detail, the first drive shaft 5 is connected to the impeller 32 through the cover 31. The first drive shaft 5 is attached at the distal end thereof to the cover 31 of the torque converter 3.

<Second Drive Shaft 6>

The second drive shaft 6 transmits the torque between the torque converter 3 and the reducer 9. The second drive shaft 6 transmits the torque, inputted thereto from the torque converter 3, to the drive wheel side. When described in detail, the second drive shaft 6 outputs the torque, inputted thereto from the torque converter 3, to the reducer 9. The second drive shaft 6 extends from the torque converter 3 toward the electric motor 2 in the axial direction.

The second drive shaft 6 has a cylindrical shape. The first drive shaft 5 extends through the interior of the second drive shaft 6. It should be noted that the first drive shaft 5 is solid. The second drive shaft 6 is attached at one end thereof (the right end in FIG. 1) to the turbine 33 of the torque converter 3. On the other hand, the second drive shaft 6 is provided with the gear 61 attached to the other end thereof. For example, the second drive shaft 6 is rotatably supported by the reducer casing 92 or so forth through a bearing member and/or so forth.

<Second One-Way Clutch 50>

The drive unit 100 further includes a second one-way clutch 50. The second one-way clutch 50 is disposed between the first drive shaft 5 and the second drive shaft 6. When described in detail, the second one-way clutch 50 is disposed between the cover 31 and the turbine 33. The second one-way clutch 50 makes the first drive shaft 5 rotatable relative to the second drive shaft 6 in the forward rotational direction. In other words, the second one-way clutch 50 is configured such that the first drive shaft 5 is rotated relative to the second drive shaft 6 when the electric motor 2 is forwardly rotated to move the vehicle forward. Because of this, in forward movement of the vehicle, the second one-way clutch 50 does not transmit the torque from the first drive shaft 5 to the second drive shaft 6.

By contrast, the second one-way clutch 50 makes the first drive shaft 5 unitarily rotate with the second drive shaft 6 in the reverse rotational direction. In other words, the second one-way clutch 50 is configured such that the first drive shaft 5 is unitarily rotated with the second drive shaft 6 when the electric motor 2 is reversely rotated to move the vehicle rearward. Because of this, in rearward movement of the vehicle, the second one-way clutch 50 transmits the torque from the first drive shaft 5 to the second drive shaft 6. In other words, in rearward movement of the vehicle, the torque generated by the electric motor 2 is transmitted from the first drive shaft 5 to the second drive shaft 6 through the second one-way clutch 50 without through the torque converter 3.

<Torque Converter Casing 4>

The torque converter casing 4 accommodates the torque converter 3. The torque converter casing 4 and the outer shell of the torque converter 3 are disposed away from each other at an interval. Because of this, the torque converter casing 4 and the outer shell of the torque converter 3 form an air layer therebetween.

The torque converter casing 4 is disposed to be non-rotatable. For example, the torque converter casing 4 is fixed to the vehicle body frame or so forth.

The torque converter casing 4 includes a first air intake port 41 and a first air discharge port 42. Each of the first air intake port 41 and the first air discharge port 42 is composed of at least one through hole that penetrates the torque converter casing 4 so as to make inside and outside of the torque converter casing 4 communicate with each other.

The first air intake port 41 is configured to draw the air into the torque converter casing 4 therethrough. The fresh air is supplied into the torque converter casing 4 through the first air intake port 41.

The first air discharge port 42 is configured to discharge the air inside the torque converter casing 4. The air inside the torque converter casing 4 is discharged to the outside of the torque converter casing 4 through the first air discharge port 42.

The first air discharge port 42 is disposed above the first air intake port 41. The first air intake port 41 and the first air discharge port 42 are opened in different directions. Specifically, the first air discharge port 42 is opened upward. By contrast, the first air intake port 41 is opened downward. The air drawn through the first air intake port 41 flows through the space between the torque converter casing 4 and the torque converter 3 and is then discharged through the first air discharge port 42.

<Battery 7>

The battery 7 is configured to supply and receive electric power to and from the electric motor 2. Specifically, the battery 7 is electrically connected to the electric motor 2; then, the battery 7 supplies electric power to the electric motor 2 and stores electric power generated by rotation of the electric motor 2. When described in detail, the battery 7 is connected to the electric motor 2 through the inverter 20.

<First Air Discharge Channel 81>

The first air discharge channel 81 extends from the first air discharge port 42 to the battery 7. The air, discharged through the first air discharge port 42, flows through the interior of the first air discharge channel 81. For example, the first air discharge channel 81 may comprise piping making the air flow through the interior thereof. The air, heated inside the torque converter casing 4, is transferred to the battery 7 through the first air discharge channel 81, whereby the battery 7 is heated by the heated air. It should be noted that the first air discharge channel 81 may extend into a vehicle cab through the battery 7. Alternatively, the first air discharge channel 81 may extend not to the battery 7 but into the vehicle cab.

<Second Air Discharge Channel 82>

The second air discharge channel 82 extends from the second air discharge port 212 to the battery 7. The air, discharged through the second air discharge port 212, flows through the interior of the second air discharge channel 82. For example, the second air discharge channel 82 is a piping making the air flow through the interior thereof. The air, heated inside the motor casing 21, is transferred to the battery 7 through the second air discharge channel 82, whereby the battery 7 is heated by the heated air. It should be noted that the second air discharge channel 82 may extend into the vehicle cab through the battery 7. Alternatively, the second air discharge channel 82 may extend not to the battery 7 but into the vehicle cab.

<Third Air Discharge Channel 83>

The third air discharge channel 83 extends from the third air discharge port 204 to the battery 7. The air, discharged through the third air discharge port 204, flows through the interior of the third air discharge channel 83. For example, the third air discharge channel 83 is a piping making the air flow through the interior thereof. The air, heated inside the inverter casing 202, is transferred to the battery 7 through the third air discharge channel 83, whereby the battery 7 is heated by the heated air. It should be noted that the third air discharge channel 83 may extend into the vehicle cab through the battery 7. Alternatively, the third air discharge channel 83 may extend not to the battery 7 but into the vehicle cab.

<Blower 84>

A blower 84 is configured to supply the air into the torque converter casing 4 through the first air intake port 41. When described in detail, the blower 84 supplies the air into the torque converter casing 4 through a first supply channel 85 and the first air intake port 41.

Moreover, the blower 84 is configured to supply the air into the motor casing 21 through the second air intake port 211. When described in detail, the blower 84 supplies the air into the motor casing 21 through a second supply channel 86 and the second air intake port 211.

Furthermore, the blower 84 is configured to supply the air into the inverter casing 202 through the third air intake port 203. When described in detail, the blower 84 supplies the air into the inverter casing 202 through a third supply channel 87 and the third air intake port 203.

[Modifications]

One embodiment of the present invention has been explained above. However, the present invention is not limited to the above, and a variety of changes can be made without departing from the gist of the present invention. It should be noted that basically speaking, modifications to be described are applicable simultaneously.

(a) In the embodiment described above, the electric motor 2 has been exemplified as the prime mover; however, the prime mover for the drive unit 100 is not limited to the electric motor 2. For example, an engine may be used as the prime mover for the drive unit 100.

Figure 2:
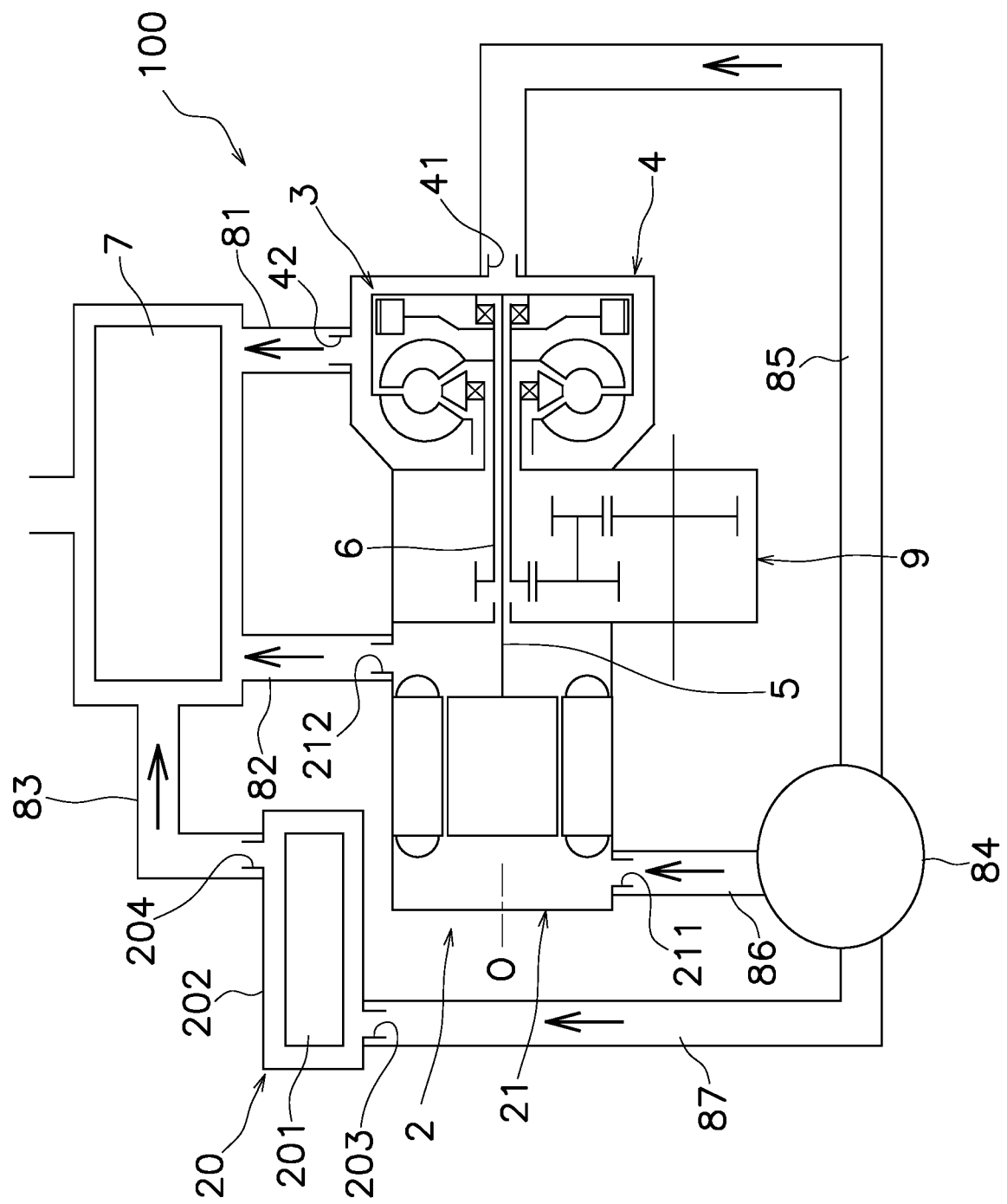
FIG. 2 is a schematic diagram of a drive unit according to a modification.

(b) In the embodiment described above, both the first air intake port 41 and the first air discharge port 42 are disposed in the outer peripheral part of the torque converter casing 4; however, the position of the first air intake port 41 and that of the first air discharge port 42 are not limited to the above. For example, as shown in FIG. 2, the first air discharge port 42 may be disposed radially outside the first air intake port 41. Specifically, the first air discharge port 42 is provided in the outer peripheral part of the torque converter casing 4. On the other hand, the first air intake port 41 is provided in a radially middle part of the torque converter casing 4. The first air intake port 41 is opened along the axial direction. When described in detail, the first air intake port 41 is disposed in opposition to the rotational axis of the torque converter 3.

Additionally, as shown in FIG. 2, the first air intake port 41 may be opened in the axial direction, whereas the first air discharge port 42 may be opened in the radial direction.

Figure 3:
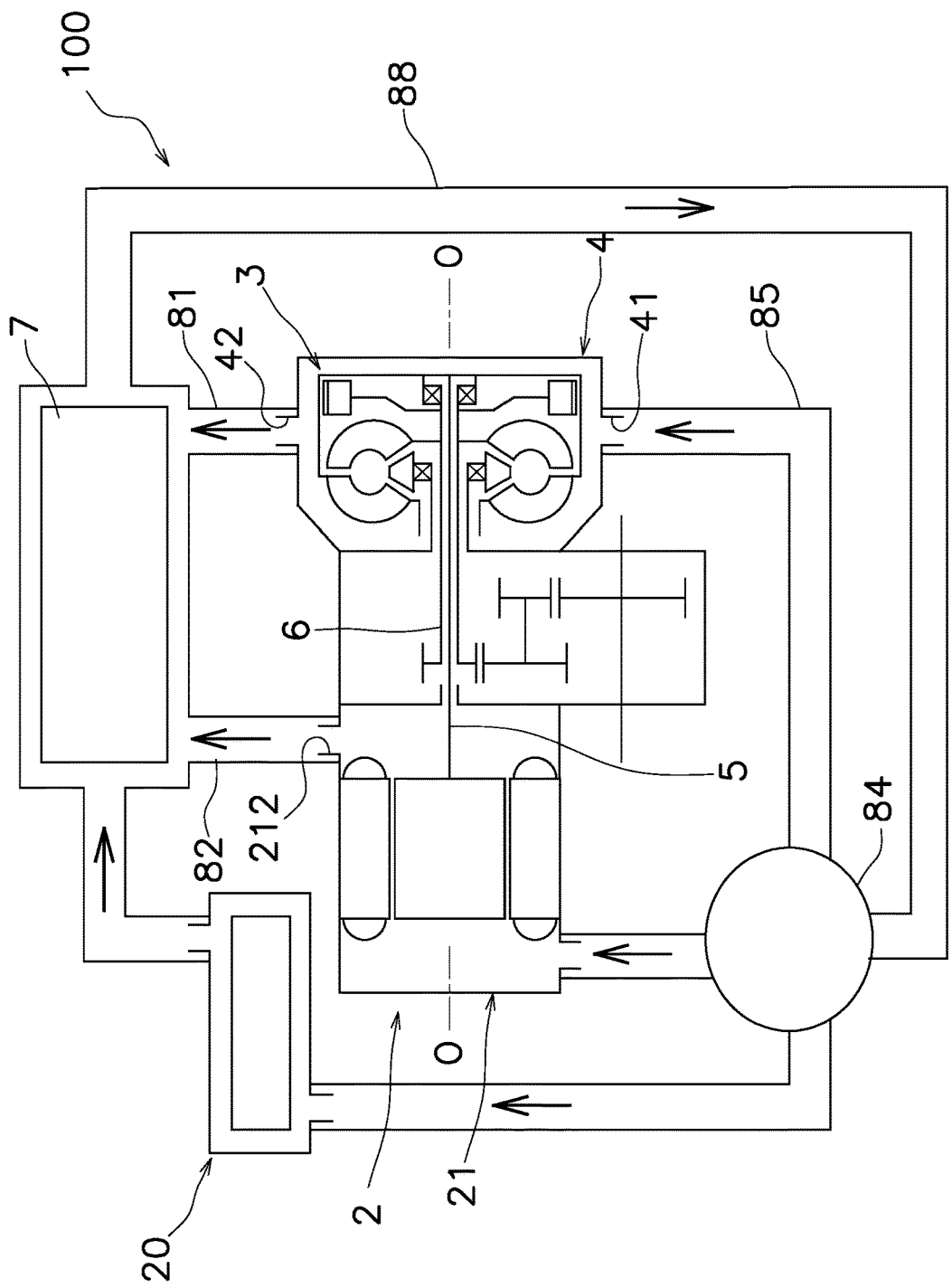
FIG. 3 is a schematic diagram of a drive unit according to another modification.

(c) As shown in FIG. 3, the drive unit 100 may further include a circulation channel 88. The circulation channel 88 is configured to return the air, transferred to an object to be heated (the battery 7 or the vehicle cab), to the first air intake port 41. When described in detail, the circulation channel 88 is connected to the first air intake port 41 through the blower 84 and the first supply channel 85.

REFERENCE SIGNS LIST

2: Electric motor
21: Motor casing
211: Second air intake port
212: Second air discharge port
22: Motor stator
23: Rotor
3: Torque converter
32: Impeller
33: Turbine
4: Torque converter casing
41: First air intake port
42: First air discharge port
81: First air discharge channel
84: Blower
88: Circulation channel
100: Drive unit

What is claimed is:

1. A drive unit comprising:
a prime mover;
a torque converter disposed to be rotatable, the torque converter configured to amplify a torque generated by the prime mover;
a torque converter casing disposed to be non-rotatable, the torque converter casing accommodating the torque converter, the torque converter casing including a first air intake port and a first air discharge port, the first air intake port configured to draw air into the torque converter casing therethrough, the first air discharge port configured to discharge the air inside the torque converter casing therethrough; and an air discharge channel extending from the first air discharge port to an object to be heated.

2. The drive unit according to claim 1, wherein the first air discharge port is disposed above the first air intake port.

3. The drive unit according to claim 1, wherein the first air discharge port is disposed radially outside the first air intake port.

4. The drive unit according to claim 1, wherein the prime mover is an electric motor.

5. The drive unit according to claim 4, wherein the electric motor includes
a rotor disposed to be rotatable,
a motor stator disposed radially away from the rotor at an interval, and
a motor casing accommodating the rotor and the motor stator, the motor casing including a second air intake port and a second air discharge port, the second air intake port configured to draw the air into the motor casing therethrough, the second air discharge port configured to discharge the air inside the motor casing therethrough.

6. The drive unit according to claim 5, wherein
the second air intake port is disposed axially away from the second air discharge port at an interval, and
the rotor and the motor stator are disposed axially between the second air intake port and the second air discharge port.

7. The drive unit according to claim 1, further comprising:
a circulation channel configured to return the air to the first air intake port after the air is transferred to the object to be heated.

8. The drive unit according to claim 1, further comprising:
a blower configured to supply the air into the torque converter casing through the first air intake port.

9. A drive unit comprising:
an electric motor;
a torque converter disposed to be rotatable, the torque converter configured to amplify a torque generated by the electric motor; and
a torque converter casing disposed to be non-rotatable, the torque converter casing accommodating the torque converter, the torque converter casing including a first air intake port and a first air discharge port, the first air intake port configured to draw air into the torque converter casing therethrough, the first air discharge port configured to discharge the air inside the torque converter casing therethrough;
wherein the electric motor includes
a rotor disposed to be rotatable,
a motor stator disposed radially away from the rotor at an interval, and
a motor casing accommodating the rotor and the motor stator, the motor casing including a second air intake port and a second air discharge port, the second air intake port configured to draw the air into the motor casing therethrough, the second air discharge port configured to discharge the air inside the motor casing therethrough.

10. A drive unit comprising:
a prime mover;
a torque converter disposed to be rotatable, the torque converter configured to amplify a torque generated by the prime mover;
a torque converter casing disposed to be non-rotatable, the torque converter casing accommodating the torque converter, the torque converter casing including a first air intake port and a first air discharge port, the first air intake port configured to draw air into the torque converter casing therethrough, the first air discharge port configured to discharge the air inside the torque converter casing therethrough; and
a blower configured to supply the air into the torque converter casing through the first air intake port.

* * * * *